G. T. DUNLOP AND J. J. BOOBAR.
FARE METER INSTALLATION FOR AUTOMOBILES.
APPLICATION FILED MAY 18, 1918.
1,310,907.
Patented July 22, 1919.
2 SHEETS—SHEET 1.
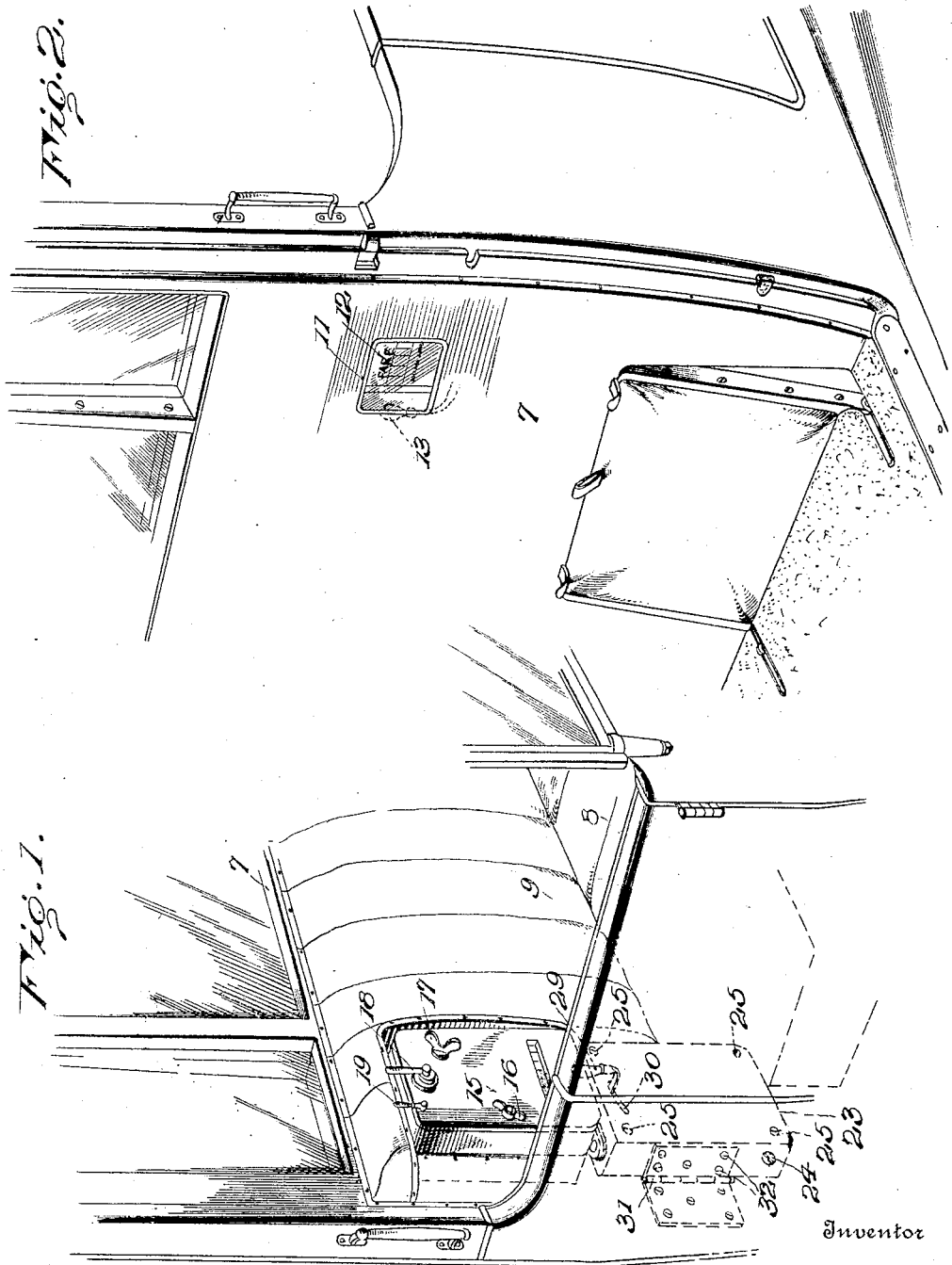

G. T. DUNLOP AND J. J. BOOBAR.
FARE METER INSTALLATION FOR AUTOMOBILES.
APPLICATION FILED MAY 18, 1918.
1,310,907.
Patented July 22, 1919.
2 SHEETS—SHEET 2.
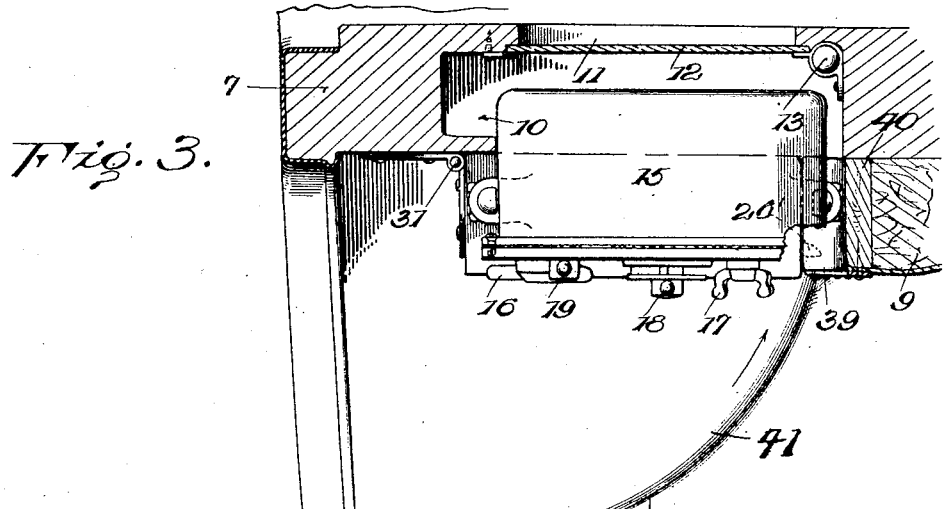
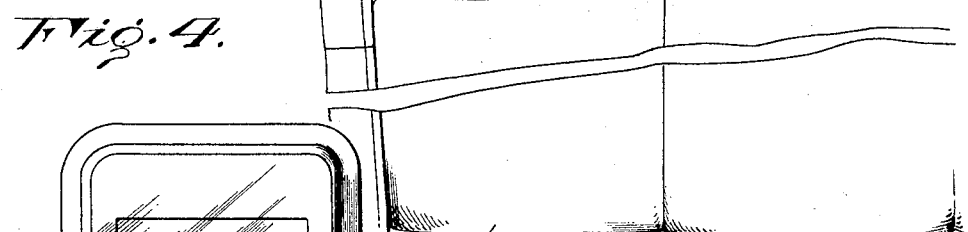
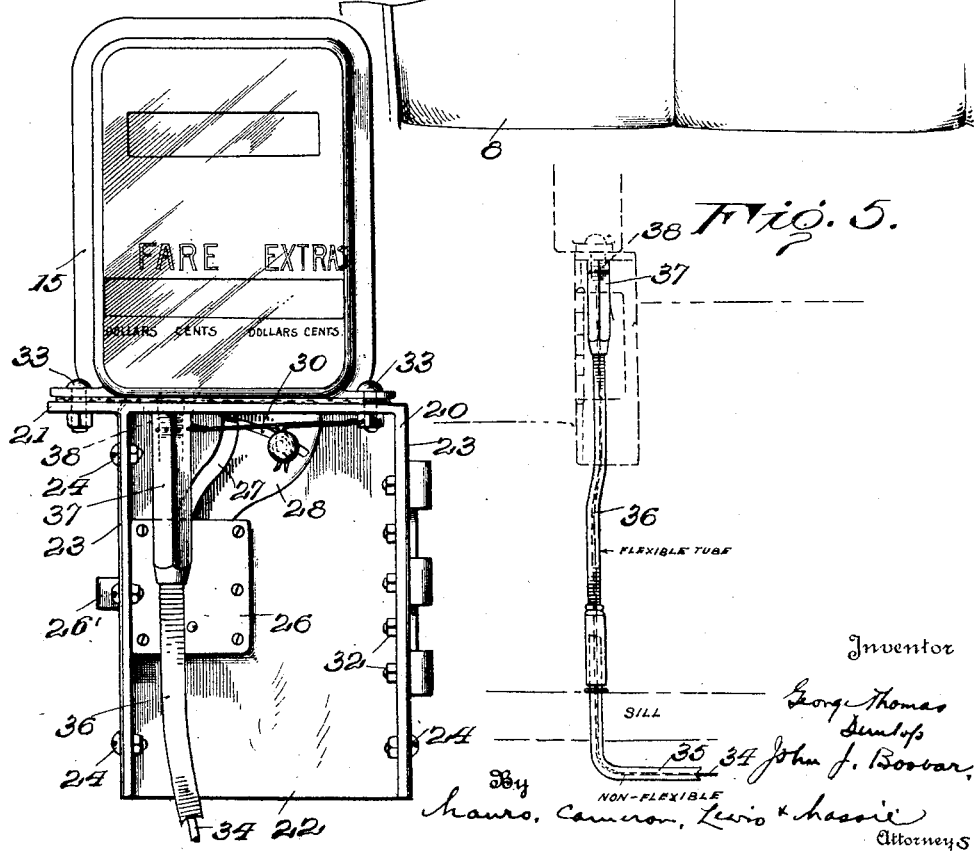

UNITED STATES PATENT OFFICE.

GEORGE THOMAS DUNLOP AND JOHN J. BOOBAR, OF WASHINGTON, DISTRICT OF COLUMBIA, ASSIGNORS TO TERMINAL TAXICAB COMPANY, OF WASHINGTON, DISTRICT OF COLUMBIA, A CORPORATION OF VIRGINIA.

FARE-METER INSTALLATION FOR AUTOMOBILES.

1,310,907.      Specification of Letters Patent.      Patented July 22, 1919.

Application filed May 18, 1918. Serial No. 235,396.

*To all whom it may concern:*

Be it known that we, GEORGE THOMAS DUNLOP and JOHN J. BOOBAR, citizens of the United States of America, and residents of Washington, District of Columbia, have invented a new and useful Improvement in Fare-Meter Installation for Automobiles, which invention is fully set forth in the following specification.

The taxi-meter of a taxi-cab, or other automobile for hire at meter rates, must be visible to the passenger, from his position within the vehicle, to advise him of the amount payable, and visible to the driver from his position in the driver's seat to inform him of the amount to be collected. It is the common practice to mount the meter in an elevated angular fixed position at one side of the front of the vehicle whereby its indicating face is visible to both the driver and passenger; in the case of a closed vehicle, such position of the meter renders it visible to the passenger through one of the usual windows in the division wall at the back of the driver's seat. As so positioned the meter is unsightly, breaks the lines of the design of the body, and is in the way. So positioned the meter is also a conspicuous badge of the public character of the vehicle, which is unnecessary and, to many passengers desiring to patronize such vehicles, distasteful and otherwise objectionable.

In overcoming such objections and attaining other important objects, the present invention provides for mounting the meter in an inconspicuous position with means for rendering its indicating mechanism readily visible to both passenger and driver. An important feature of such means is the mounting of the meter whereby it is readily movable from its normal position to another position, its indicating mechanism being visible in one of said positions (preferably the normal position) to the passenger and in the other position visible to the driver.

The aforesaid and other important objects and features of the invention may be more readily explained and understood by reference to the accompanying drawings illustrating what is at present regarded as the preferred embodiment of the invention as applied to a taxi-cab. In said drawings:

Figure 1 is an exterior perspective of part of the front of a taxi-cab;

Fig. 2 is a perspective view looking into the right-hand door opening;

Fig. 3 is a plan view of the right-hand end of the driver's seat with the division wall of the cab body in section and the meter in its normal position projecting into a chamber or cavity in said wall;

Fig. 4 is an elevation of the meter and the carrier on which it is mounted; and

Fig. 5 is a detail view of the driving connections to the meter.

The drawings show the invention applied to an automobile of the taxi-cab type, parts of such a vehicle being shown in Figs. 1, 2 and 3. 7 is the division wall or partition between the compartment for passengers and that for the driver. The driver's seat has the usual spring bottom 8 with a cushioned back 9 secured to the front side of the wall 7. 10 is a cavity or recess formed in the wall 7 at the right-hand side of the cab, the seat-back 9 being cut away over said cavity. A small window 11, hereafter called the meter-window, opens from said cavity through the rear face of wall 7 into the compartment for passengers, and is provided with a window-glass 12 and an electric lamp 13, controlled by a suitable switch (not shown), for illuminating the meter when a passenger desires to read the same.

15 is a fare-meter, more commonly called a taxi-meter, of any suitable make. The particular one illustrated is the well-known Pittsburg meter, manufactured by the Pittsburg Taximeter Company. At its front face it has one or more small glass-covered windows through which the fare-registering and indicating mechanism is exposed to indicate the tariff payable by a passenger. At its rear face it has an initial charge control turn-button 16, a clock-wind turn-button 17, a meter pull-lever 18, and an extra lever 19. The fare-meter 15 is supported by and secured to a carrier, which in turn is movably attached to the cab. Said carrier may be of any suitable construction. As shown, it is made of a rigid metal frame 20, of inverted U-shape (with an extension 21), which fits about a block of wood 22, with a backing of thin sheet metal 23 over the wood, said backing having its side and top edges bent over against the frame 20 and secured by screw-bolts 24. Four screws 25 through the sheet-metal back 23 secure the wood block 22 in place. 26 is an ordinary cab-door latch set into the wood block 22 with its latch 26' working through a suitable slot in the frame of the carrier. A latch-operating lever 27 works in a recess 28 in block 22, with its outer end 29 extending through a slot 30 into position to be operated by the driver.

Any suitable means may be employed for movably attaching the meter-carrier to the cab. As shown, an ordinary leaf-hinge 31 is shown, one leaf being screwed to the front face of the division wall, and the other leaf secured to the carrier by five screw-bolts 32.

The fare-meter 15 is secured to the top of its carrier, with interposed packing, by two screw-bolts 33. The meter is actuated from a front wheel of the cab, in the usual manner, through a flexible shaft 34, which extends part of its length through non-flexible tubing one end of which projects upward through the sill of the car-body at the right-hand side thereof, as shown in Fig. 5. The lower end of a section of flexible tubing 36 loosely telescopes onto said upwardly projecting end of tubing 35. An elongated nut 37 rotatable on the upper end of tubing 36 engages a short tubular screw-threaded connection 38 depending from the meter 15 through an opening in frame 20 of the carrier.

In the normal position of the carrier, the latch 26' engages its keeper 39 (dotted lines Fig. 3) secured to the wood framing 40 around the edge of the meter recess provided in the cushioned seat-back 9. With the carrier so latched in position, the meter thereon projects into the cavity 10 into position to be read through the meter-window 11 by a passenger. It is to be noted that in such normal position the meter stands approximately flush with the neighboring surface of the seat-back 9, merges into the regular lines of the cab design, and is not unsightly or conspicuous.

At the end of a trip the driver actuates lever 29 to release latch 26' and then swings the carrier outward on hinge 31 to position to read the meter, the end of the driver's seat being cut away at 41 to accommodate the carrier in such movement. In their normal position the meter and its carrier do not materially interfere with the use of the front seat by another person in addition to the driver.

The word "automobile", as used in the following claims, is intended to embrace any kind of a vehicle adapted for the transportation of passengers at a rate or tariff, to be determined by a fare-meter.

What is claimed is:

1. The combination with an automobile, of a fare-meter, and means movably attaching said meter to the automobile whereby it may be moved from a position in which it is readable by a passenger to a changed position in which it is readable by the driver.

2. The combination of an automobile having a meter-window in a wall of the body thereof, of a fare-meter normally positioned with its fare-indicating mechanism readable by a passenger through said meter-window, and means attaching said meter to the automobile whereby it may be shifted from said normal position to a changed position in which it is readable by the driver.

3. The combination with an automobile having a meter observation opening through the wall at the back of a front seat thereof, of a fare-meter, and means attaching said meter to the automobile whereby it is movable from a position in which it is readable by a passenger through said meter opening to a changed position in which it is readable by the driver.

4. The combination with an automobile having a recess or cavity formed in a wall of the body thereof with a meter observation opening from said recess through said wall, of a fare-meter normally positioned in said recess and readable by a passenger through said observation opening, and means supporting and attaching said meter to the automobile whereby the meter may be moved from its said normal position to a changed position in which it is readable by the driver.

5. The combination with an automobile, of a fare-meter, means movably attaching said meter to the automobile whereby it may be moved from a position in which it is readable by a passenger to a changed position in which it is readable by the driver, and detent means for securing said meter in one of said positions and adapted to be released to permit movement of the meter to the other position.

6. The combination with an automobile having a recess or cavity formed in a wall of the body thereof with a meter observation opening from said recess through said wall, of a fare-meter normally positioned in said recess and readable by a passenger through said observation opening, means supporting and attaching said meter to the automobile whereby the meter may be moved from its normal position to a changed position in which it is readable by the driver, and detent means securing said meter in its normal position and adapted to be released to permit movement of the meter to its said changed position.

7. The combination with an automobile, of a fare-meter, a carrier on which said meter is mounted, and means movably attaching said carrier to the automobile whereby the carrier is movable from a position in which the meter is readable by a passenger to a changed position in which it is readable by the driver.

8. The combination with an automobile having a meter-window in a wall of the body thereof, of a fare-meter, a carrier on which said meter is mounted, and a hinge-connection between said carrier and the automobile whereby the carrier may be swung from a position in which the meter is readable by a passenger through said meter-window to a changed position in which it is readable by the driver.

9. The combination with an automobile having a meter-window in a wall of the body thereof, of a fare-meter, a carrier on which said meter is mounted, a hinge-connection between said carrier and the automobile whereby the carrier may be swung from a position in which the meter is readable by a passenger through said meter-window to a changed position in which it is readable by the driver, and a latch on said carrier for securing it in one of said positions and adapted to be released to permit movement of said carrier to the other position.

10. The combination with an automobile having a meter-window in a wall of the body thereof, of a fare-meter readable through said window, and a lamp positioned inside of said window-opening for illuminating the meter.

11. The combination with an automobile, of a fare-meter, means movably attaching said meter to the automobile whereby it may be bodily moved from one position to another, and driving connections to the meter including a flexible shaft inclosed by flexible tubing adjoining the meter to accommodate said bodily movement of the meter.

12. The combination with an automobile, of a fare-meter, means movably attaching said meter to the automobile whereby it may be bodily moved from one position to another, and driving connections to the meter including a flexible shaft and a section of shaft-inclosing flexible tubing adjoining the meter and loosely telescoping the end of a section of non-flexible shaft-inclosing tubing.

In testimony whereof we have signed this specification.

G. THOMAS DUNLOP.
JOHN J. BOOBAR.

Copies of this patent may be obtained for five cents each, by addressing the "Commissioner of Patents, Washington, D. C."